United States Patent
Ayuzawa

(10) Patent No.: US 11,027,422 B2
(45) Date of Patent: Jun. 8, 2021

(54) ROTARY ACTUATOR AND ROBOT

(71) Applicant: NIDEC CORPORATION, Kyoto (JP)

(72) Inventor: Yuu Ayuzawa, Nagano (JP)

(73) Assignee: NIDEC CORPORATION, Kyoto (JP)

( * ) Notice: Subject to any disclaimer, the term of this patent is extended or adjusted under 35 U.S.C. 154(b) by 384 days.

(21) Appl. No.: 16/089,364

(22) PCT Filed: Mar. 8, 2017

(86) PCT No.: PCT/JP2017/009134
§ 371 (c)(1),
(2) Date: Sep. 27, 2018

(87) PCT Pub. No.: WO2017/169580
PCT Pub. Date: Oct. 5, 2017

(65) Prior Publication Data
US 2020/0324406 A1    Oct. 15, 2020

(30) Foreign Application Priority Data

Mar. 30, 2016  (JP) .............................. JP2016-067518
Sep. 15, 2016  (JP) .............................. JP2016-180315

(51) Int. Cl.
*B25J 19/00*  (2006.01)
*B25J 9/12*   (2006.01)
(Continued)

(52) U.S. Cl.
CPC .............. *B25J 9/126* (2013.01); *H02K 7/116* (2013.01); *B25J 9/06* (2013.01); *B25J 9/102* (2013.01); *B25J 19/00* (2013.01); *F16H 49/001* (2013.01)

(58) Field of Classification Search
CPC . B25J 19/0004; B25J 9/126; B25J 9/06; B25J 9/102; B25J 19/00; F16H 25/2454; F16H 49/001; H02K 7/116
See application file for complete search history.

(56) References Cited

U.S. PATENT DOCUMENTS 6,250,433 B1 * 6/2001 Sealine .................. B60T 1/005
                                                    180/273
6,435,329 B1 * 8/2002 Amari .................... G07D 11/40
                                                    194/206
(Continued)

FOREIGN PATENT DOCUMENTS

CN        1330443        1/2002
CN      101660580        3/2010
(Continued)

OTHER PUBLICATIONS

"International Search Report (Form PCT/ISA/210)", dated Jun. 13, 2017, with English translation thereof, pp. 1-2.

*Primary Examiner* — Randell J Krug
(74) *Attorney, Agent, or Firm* — JCIPRNET

(57) ABSTRACT

Provided, for example, is a rotary actuator that is equipped with a rotation restricting mechanism for restricting the rotation of a stopped rotor. The rotation restricting mechanism is provided with: a rotation-side restricting member fixed to the rotor; a fixed-side restricting member that engages with the rotation-side restricting member and restricts the movement of the rotation-side restricting member in the circumferential direction of the rotor; and a drive mechanism that moves the fixed-side restricting member in the axial direction of the rotor. A plurality of protrusions that project toward the outer side of the radial direction of the rotor are formed in the rotation-side restricting member. A restricting part 46*a* that penetrates in between the protrusions in the circumferential direction and restricts the movement of the rotation-side restricting member in the circumferential direction is formed in the fixed-side restricting member.

4 Claims, 6 Drawing Sheets

(51) Int. Cl.
*H02K 7/116* (2006.01)
*B25J 9/06* (2006.01)
*B25J 9/10* (2006.01)
*F16H 49/00* (2006.01)

(56) References Cited

U.S. PATENT DOCUMENTS

| | | | |
|---|---|---|---|
| 8,410,732 B2 | 4/2013 | Kassow et al. | |
| 8,485,054 B2* | 7/2013 | Tateishi | H02K 7/1023 |
| | | | 74/89.39 |
| 9,182,021 B2* | 11/2015 | Muramatsu | F16H 25/12 |
| 2016/0121492 A1* | 5/2016 | Tsai | B25J 19/0004 |
| | | | 74/490.03 |

FOREIGN PATENT DOCUMENTS

| | | |
|---|---|---|
| CN | 102684375 | 9/2012 |
| CN | 105324588 | 2/2016 |
| JP | H02168832 | 6/1990 |
| JP | H03154736 | 7/1991 |
| JP | H06190774 | 7/1994 |
| KR | 20140083808 | 7/2014 |

\* cited by examiner

ROTARY ACTUATOR AND ROBOT

CROSS-REFERENCE TO RELATED APPLICATION

This application is a 371 application of the international PCT application serial no. PCT/JP2017/009134, filed on Mar. 8, 2017, which claims the priority benefit of Japan application no. 2016-067518, filed on Mar. 30, 2016 and Japan application no. 2016-180315, filed on Sep. 15, 2016. The entirety of each of the above-mentioned patent applications is hereby incorporated by reference herein and made a part of this specification.

TECHNICAL FIELD

The present invention relates to a rotary actuator including a motor and a rotation restricting mechanism for restricting rotation of a motor that has stopped. In addition, the present invention relates to a robot having such a rotary actuator.

BACKGROUND ART

Conventionally, a robot including a base, a first arm connected to the base via a joint portion, a second arm connected to a distal end side of the first arm via a joint portion, and a wrist portion connected to a distal end side of the second arm via a joint portion is known (see, for example, Patent Literature 1). In the robot described in Patent Literature 1, the joint portion includes a motor having a rotor and a stator, a speed reducer connected to the motor, and a safety brake for maintaining a stopped state of the rotor, and thereby the joint portion itself serves as a rotary actuator.

Also, in the robot described in Patent Literature 1, the safety brake includes a solenoid and an annular member fixed to a motor shaft to surround the motor shaft constituting a portion of the rotor. A ratchet is attached to a plunger of the solenoid, and the solenoid presses the ratchet against an outer circumferential surface of the annular member when power supply to the robot is turned off. Further, when the ratchet is pressed against the outer circumferential surface of the annular member, rotation of the stopped rotor is restricted.

CITATION LIST

Patent Literature

[Patent Literature 1]
U.S. Pat. No. 8,410,732

Technical Problem

In the robot described in Patent Literature 1, since rotation of a stopped rotor is restricted by a ratchet pressing against an outer circumferential surface of an annular member fixed to the motor shaft, slipping may occur between the annular member and the ratchet to cause the rotor to rotate, when an external force in a rotational direction is applied to the stopped rotor due to external disturbance or the like. Therefore, in the robot described in Patent Literature 1, when a large external force in the rotational direction acts on a rotor that has stopped, or when an external force in the rotational direction acts on a rotor that has stopped for a long time, there is a likelihood that the stopped rotor will deviate greatly from a stopped position.

Therefore, an objective of the present invention is to provide, in a rotary actuator including a motor having a rotor and a stator, and a rotation restricting mechanism that restricts rotation of a stopped rotor, a rotary actuator capable of inhibiting a deviation of the stopped rotor from a stopped position thereof even when an external force in a rotational direction acts on the stopped rotor. Also, another objective of the present invention is to provide a robot having such a rotary actuator.

Solution to Problem

To solve the above problem, the rotary actuator of the present invention includes a motor including a rotor and a stator, and a rotation restricting mechanism which restricts rotation of the rotor that has stopped, in which the rotation restricting mechanism has a substantially annular rotation-side restricting member fixed to the rotor, a fixed-side restricting member which engages with the rotation-side restricting member to restrict movement of the rotation-side restricting member in a circumferential direction of the rotor, and a drive mechanism which moves the fixed-side restricting member in an axial direction of the rotor, a plurality of protrusions which protrude inward or outward in a radial direction of the rotor are formed on the rotation-side restricting member at regular intervals in the circumferential direction, a restricting portion which enters between the protrusions in the circumferential direction to restrict movement of the rotation-side restricting member in the circumferential direction is formed in the fixed-side restricting member, and the drive mechanism moves the fixed-side restricting member between a restriction position at which the restricting portion is disposed between the protrusions in the circumferential direction and a restriction release position at which the restricting portion is removed from between the protrusions in the circumferential direction.

In the rotary actuator of the present invention, the plurality of protrusions protruding in the radial direction of the rotor are formed on the substantially annular rotation-side restricting member fixed to the rotor at regular intervals in the circumferential direction. Further, in the present invention, the restricting portion which enters between the protrusions in the circumferential direction to restrict movement of the rotation-side restricting member in the circumferential direction is formed in the fixed-side restricting member, and the fixed-side restricting member moves to the restriction position at which the restricting portion is disposed between the protrusions in the circumferential direction. Therefore, in the present invention, when the fixed-side restricting member is at the restriction position, and in a case in which an external force in the rotational direction acts on the stopped rotor, although the rotor rotates to an extent as much as a gap between each of the protrusions and the restricting portion in the circumferential direction, it is possible to prevent the rotor from rotating more by than this gap. Therefore, in the present embodiment, even when an external force in the rotational direction acts on the stopped rotor, a deviation of the stopped rotor from the stopped position can be inhibited using the fixed-side restricting member disposed at the restriction position and the rotation-side restricting member.

In the present invention, the drive mechanism includes, for example, a biasing member which biases the fixed-side restricting member toward one side in the axial direction, and a solenoid which moves the fixed-side restricting member to the other side in the axial direction.

In the present invention, the rotary actuator may further include a case body in which the motor and the rotation restricting mechanism are accommodated, in which the biasing member may bias the fixed-side restricting member toward the restriction position, the solenoid may move the fixed-side restricting member at the restriction position to the restriction release position, the fixed-side restricting member may be fixed to one end portion of a plunger of the solenoid, a through hole in which the other end portion of the plunger or a pin fixed to the other end portion of the plunger is disposed may be formed in the case body, the other end portion of the plunger or a portion of the pin may protrude to the outside of the case body when the fixed-side restricting member is at the restriction position, and the fixed-side restricting member at the restriction position may move to the restriction release position when the other end portion of the plunger or a portion of the pin protruding to the outside of the case body is pushed toward the inside of the case body.

With such a configuration, since the biasing member biases the fixed-side restricting member toward the restriction position, even when power supply to the rotary actuator is turned off, a deviation of the stopped rotor from the stopped position can be inhibited. Further, with such a configuration, since the other portion of the plunger or a portion of the pin protrudes to the outside of the case body when the fixed-side restricting member is at the restriction position, and the fixed-side restricting member at the restriction position moves to the restriction release position when the other portion of the plunger or a portion of the pin protruding to the outside of the case body is pushed toward the inside of the case body, it is possible to move the fixed-side restricting member at the restriction position to the restriction release position by a manual operation or the like even when power supply to the rotary actuator is turned off. Therefore, it is possible to rotate the rotor even when power supply to the rotary actuator is turned off.

In the present invention, an outer shape of the restricting portion may be circular when viewed from the axial direction, and a diameter of the restricting portion when viewed from the axial direction may be substantially half of a distance between the protrusions in the circumferential direction. With such a configuration, it is possible to inhibit a deviation of the stopped rotor from the stopped position while reducing a size of the restricting portion in the radial direction of the rotor. Therefore, it is possible to inhibit a deviation of the stopped rotor from the stopped position while reducing a size of the rotary actuator in the radial direction of the rotor.

In the present invention, it is preferable that the protrusions protrude outward in the radial direction. With such a configuration, since it is possible to dispose the fixed-side restricting member and the drive mechanism on an outer circumferential side of the rotation-side restricting member in which a relatively large space is easily secured, the fixed-side restricting member and the drive mechanism are more easily disposed.

The rotary actuator of the present invention can be used for a robot having a joint portion constituted by the rotary actuator. In this robot, even when an external force in the rotational direction acts on a stopped rotor, it is possible to inhibit a deviation of the stopped rotor from the stopped position. Therefore, even when an external force in the rotational direction acts on the stopped rotor, it is possible to inhibit a deviation in posture of a robot that has stopped.

Advantageous Effects of Invention

As described above, in the present invention, in a rotary actuator including a motor having a rotor and a stator, and a rotation restricting mechanism that restricts rotation of a rotor that has stopped, a deviation of the stopped rotor from the stopped position can be inhibited even when an external force in a rotational direction acts on the stopped rotor. Further, in the robot of the present invention, even when an external force in the rotational direction acts on a stopped rotor, it is possible to inhibit a deviation of the stopped rotor from the stopped position, and as a result, it is possible to inhibit a deviation in posture of a robot that has stopped.

BRIEF DESCRIPTION OF DRAWINGS

FIG. 4 (A) and FIG. 4(B) is an enlarged view for explaining a configuration of a portion G in FIG. 3, in which FIG. 4(A) is a view illustrating a state in which a fixed-side restricting member is at a restriction release position and FIG. 4(B) is a view illustrating a state in which the fixed-side restricting member is at a restriction position.

DESCRIPTION OF EMBODIMENTS

Hereinafter, embodiments of the present invention will be described with reference to the drawings.

Schematic Configuration of Industrial Robot

Figure 1:
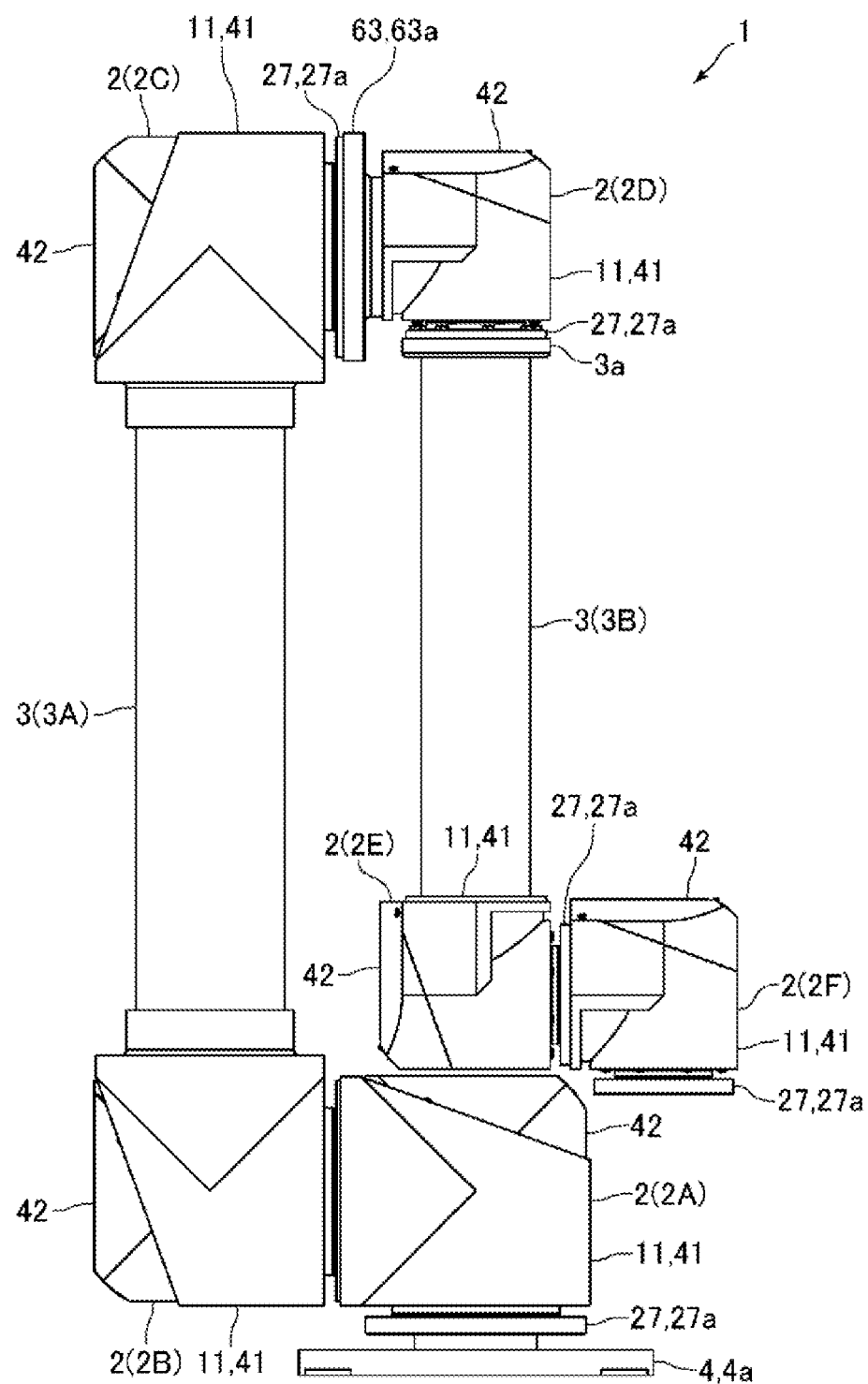
FIG. 1 is a front view of an industrial robot according to an embodiment of the present invention.
Figure 2A:
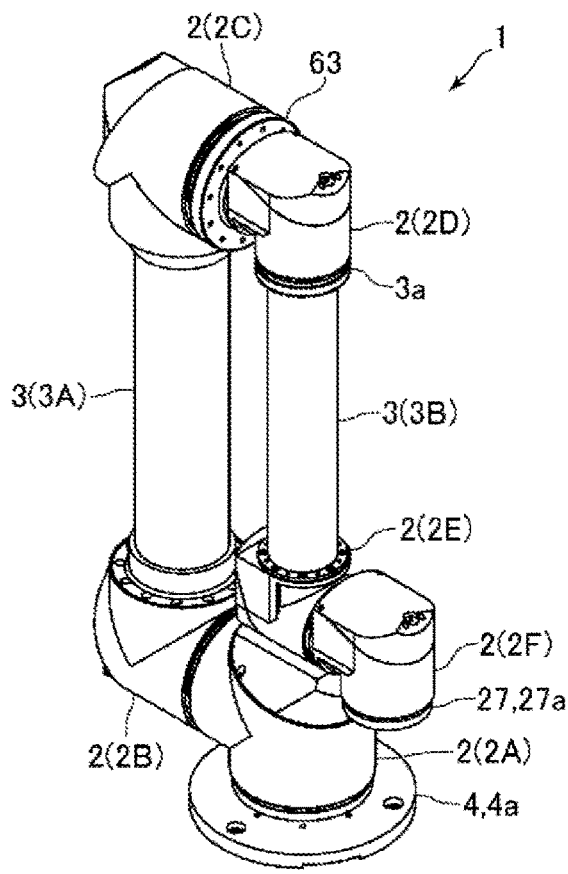
FIG. 2(A) is a perspective view of the industrial robot illustrated in FIG. 1.
Figure 2B:
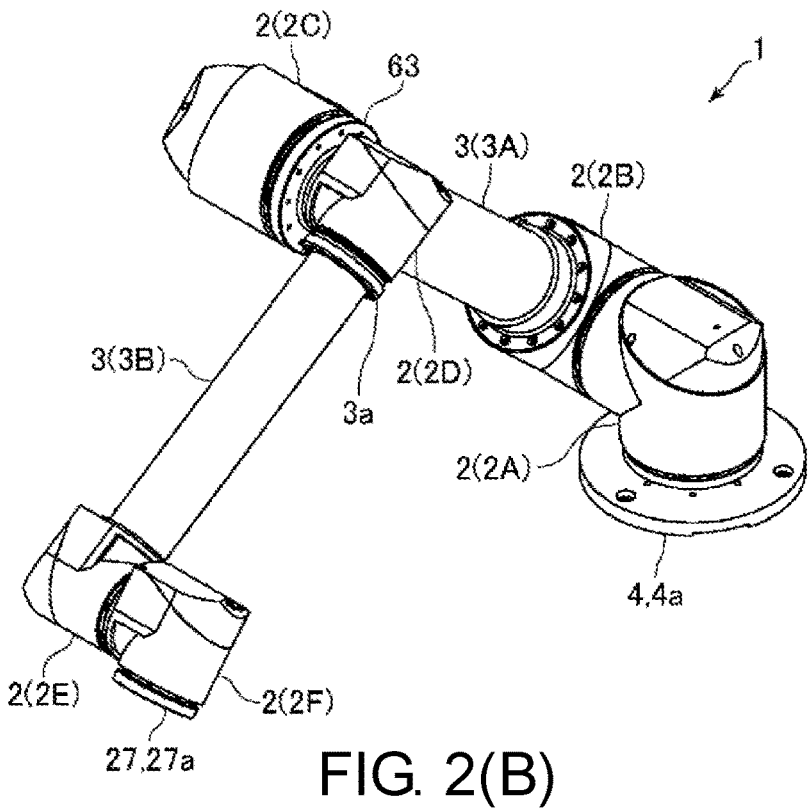
FIG. 2(B) is a perspective view illustrating a state in which the industrial robot illustrated in FIG. 2(A) is operating.

FIG. 1 is a front view of an industrial robot 1 according to an embodiment of the present invention. FIG. 2(A) is a perspective view of the industrial robot 1 illustrated in FIG. 1, and FIG. 2(B) is a perspective view illustrating a state in which the industrial robot 1 illustrated in FIG. 2(A) is operating.

The industrial robot 1 (hereinafter referred to as "robot 1") of the present embodiment is an articulated robot used for assembling or manufacturing predetermined products, and is installed and used in assembly lines or manufacturing lines. The robot 1 includes a plurality of joint portions 2 and a plurality of arms 3. In this embodiment, the robot 1 includes six joint portions 2 and two arms 3. Hereinafter, when the six joint portions 2 are distinguished for indicating them individually, each of the six joint portions 2 is referred to as a "first joint portion 2A," a "second joint portion 2B," a "third joint portion 2C," a "fourth joint portion 2D," a "fifth joint portion 2E," and a "sixth joint portion 2F." In addition, in the following description, when the two arms 3 are distinguished for indicating them individually, the two respective arms 3 are referred to as a "first arm 3A," and a "second arm 3B."

Further, the robot 1 includes a support member 4 connected to the first joint portion 2A such that these are rotatable relative to each other. The support member 4 is formed in a flanged cylindrical shape having a flange portion 4a, and a through hole (not illustrated) penetrating in an axial direction of the support member 4 is formed on an inner circumferential side of the support member 4. The flange portion 4a is formed in an annular shape and constitutes a bottom surface portion of the robot 1. The arm 3 is formed in an elongated cylindrical shape.

In the robot 1, the first joint portion 2A and the second joint portion 2B are connected such that these are rotatable relative to each other, and the second joint portion 2B and a base end of the first arm 3A are fixed. Also, a distal end of the first arm 3A and the third joint portion 2C are fixed, the third joint portion 2C and the fourth joint portion 2D are connected such that these are rotatable relative to each other, the fourth joint portion 2D and a base end of the second arm 3B are connected such that these are rotatable relative to each other, a distal end of the second arm 3B and the fifth joint portion 2E are fixed, and the fifth joint portion 2E and the sixth joint portion 2F are connected such that these are rotatable relative to each other. Further, a hand, a tool, or the like can be attached to the sixth joint portion 2F such that these are rotatable relative to each other.

Hereinafter, a specific configuration of the joint portions 2 will be described. As illustrated in FIG. 1, in this embodiment, the first joint portion 2A, the second joint portion 2B, and the third joint portion 2C are formed to have the same size, and the fourth joint portion 2D, the fifth joint portion 2E, and the sixth joint portion 2F are formed to have the same size. Also, sizes of the first joint portion 2A, the second joint portion 2B, and the third joint portion 2C are larger than sizes of the fourth joint portion 2D, the fifth joint portion 2E, and the sixth joint portion 2F. However, the first joint portion 2A, the second joint portion 2B, and the third joint portion 2C are configured similarly to the fourth joint portion 2D, the fifth joint portion 2E, and the sixth joint portion 2F except for a difference in size.

Configuration of Joint Portion

Figure 3:
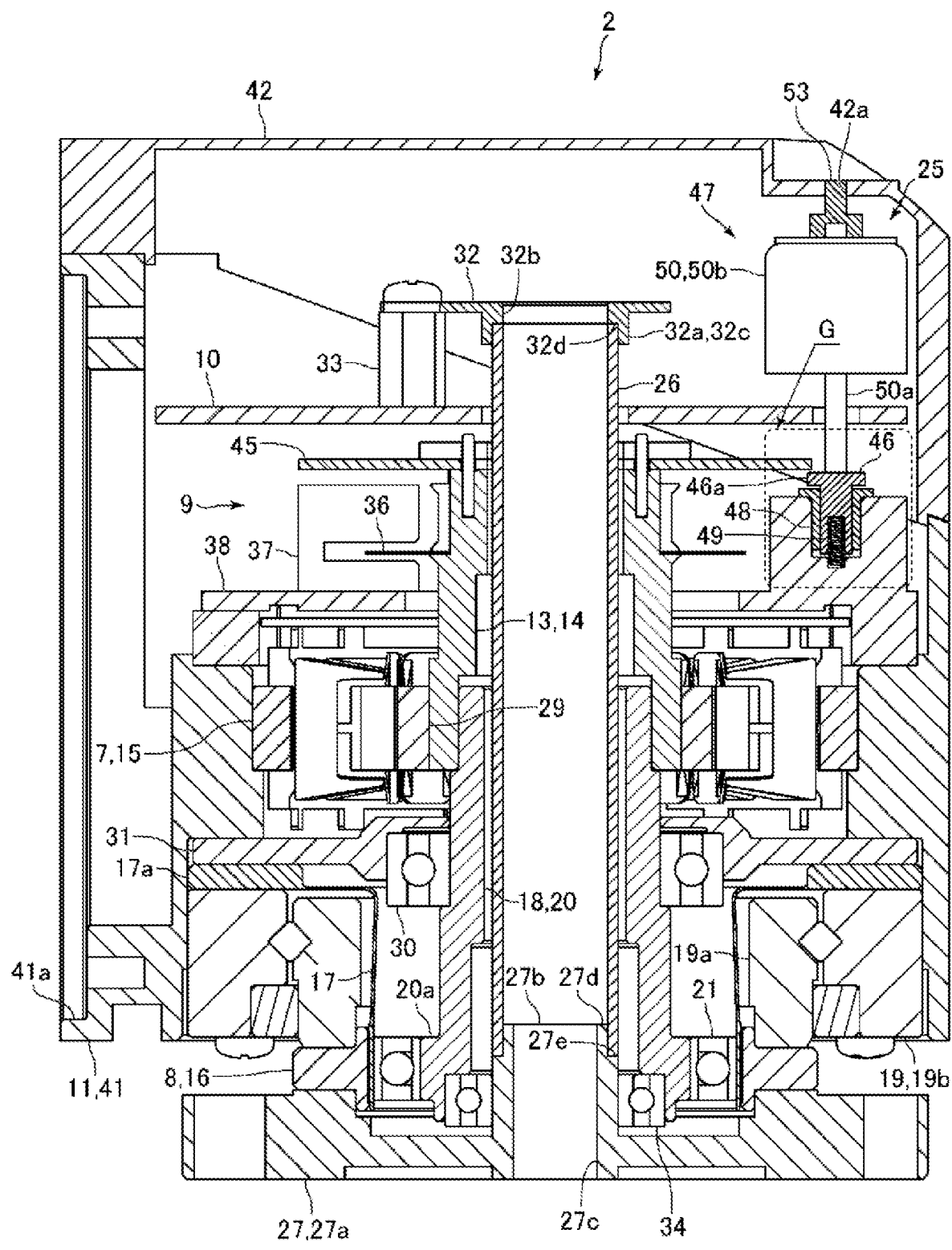
FIG. 3 is a longitudinal sectional view of a joint portion illustrated in FIG. 1.
Figure 4A:
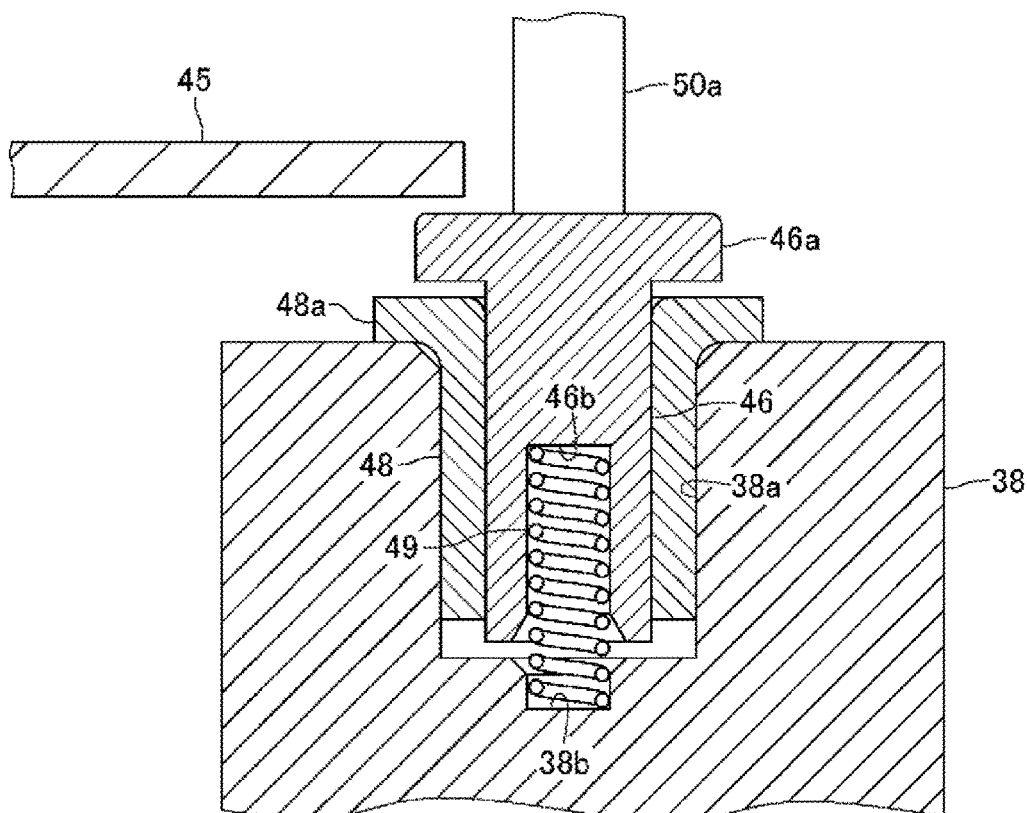
Figure 4B:
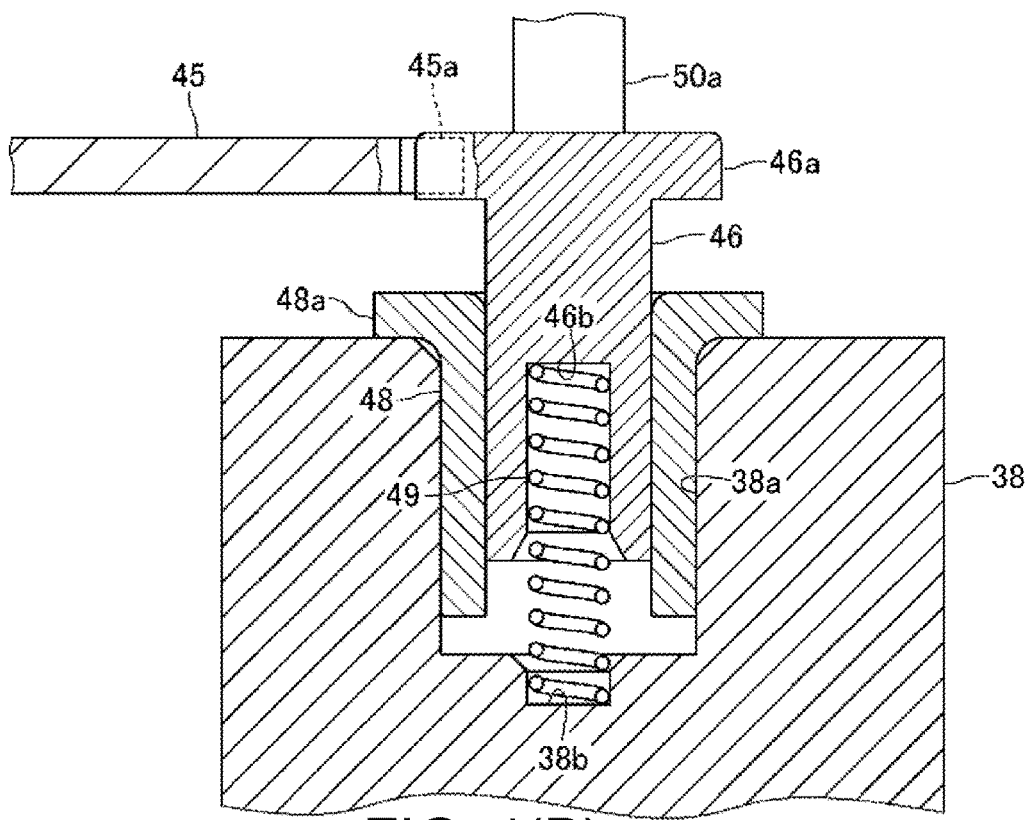
Figure 5:
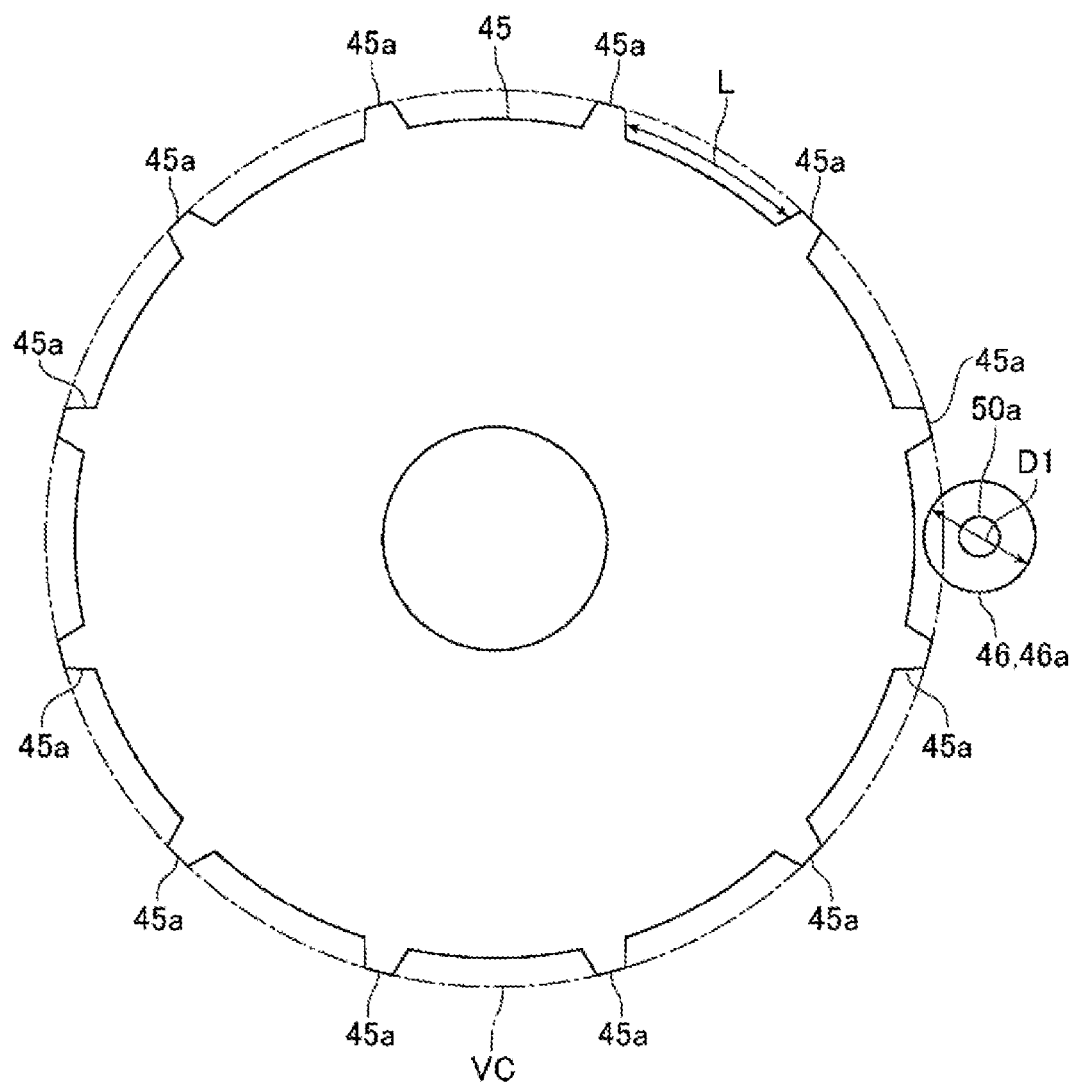
FIG. 5 is a plan view of a rotation-side restricting member and the fixed-side restricting member illustrated in FIG. 3.
Figure 6A:
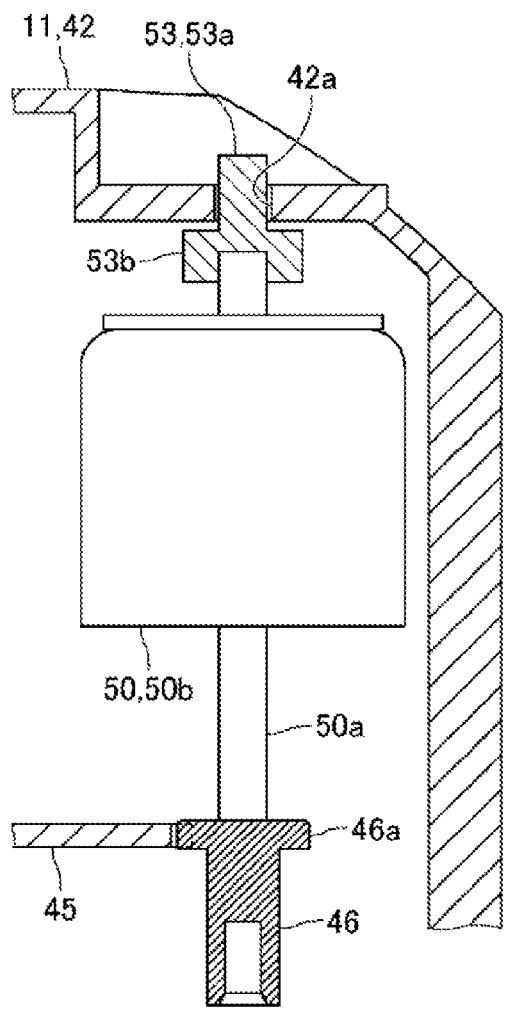
FIG. 6(A) is an enlarged view for explaining a state of a pin when the fixed-side restricting member illustrated in FIG. 3 is at the restriction position.
Figure 6B:
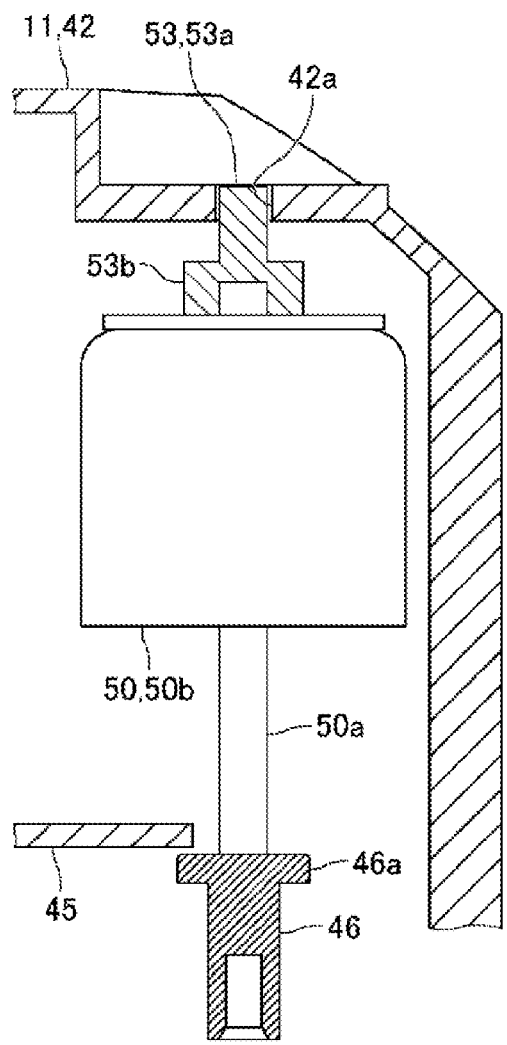
FIG. 6(B) is an enlarged view for explaining a state of the pin when the fixed-side restricting member illustrated in FIG. 3 is at the restriction release position.

FIG. 3 is a longitudinal sectional view of one of the joint portions 2 illustrated in FIG. 1. FIG. 4(A) and FIG. 4B is an enlarged view for explaining a configuration of a portion G in FIG. 3, in which FIG. 4(A) is a view illustrating a state in which a fixed-side restricting member 46 is at a restriction release position and FIG. 4(B) is a view illustrating a state in which the fixed-side restricting member 46 is at a restriction position. FIG. 5 is a plan view of a rotation-side restricting member 45 and the fixed-side restricting member 46 illustrated in FIG. 3. FIG. 6(A) is an enlarged view for explaining a state of a pin 53 when the fixed-side restricting member 46 illustrated in FIG. 3 is at the restriction position, and FIG. 6(B) is an enlarged view for explaining a state of the pin 53 when the fixed-side restricting member 46 illustrated in FIG. 3 is at the restriction release position. Hereinafter, for convenience of description, a Z1 direction side in FIG. 3 will be referred to as an "upper" side and the opposite Z2 direction side will be referred to as a "lower" side.

Each of the joint portions 2 includes a motor 7, a speed reducer 8 connected to the motor 7, a position detection mechanism 9 for detecting a rotational position of the motor 7, a circuit board 10 to which the motor 7 and the position detection mechanism 9 are electrically connected, and a case body 11 in which the motor 7, the speed reducer 8, the position detection mechanism 9, and the circuit board 10 are accommodated, and thereby the joint portion 2 itself serves as a rotary actuator. That is, the joint portion 2 is constituted by a rotary actuator.

The motor 7 is a hollow motor in which a through hole is formed at a center in a radial direction, and has a hollow rotating shaft 13. Further, the motor 7 includes a rotor 14 and a stator 15. The speed reducer 8 is a hollow speed reducer in which a through hole is formed in a center in a radial direction. The motor 7 and the speed reducer 8 are disposed to overlap each other in a vertical direction. Specifically, the motor 7 is disposed on an upper side and the speed reducer 8 is disposed on a lower side. Further, the motor 7 and the speed reducer 8 are disposed coaxially.

The speed reducer 8 of the present embodiment is a hollow wave gear device, and includes a rigid internally toothed gear 16, a flexible externally toothed gear 17, a wave generator 18, and a cross roller bearing 19. The wave generator 18 includes a hollow input shaft 20 connected to the rotating shaft 13 and a wave bearing 21 attached to an outer circumferential side of the input shaft 20. In the present embodiment, the rigid internally toothed gear 16 serves as an output shaft of the speed reducer 8. Further, the joint portion 2 includes a rotation restricting mechanism 25 for restricting rotation of the stopped rotor 14, a cylindrical tubular member 26 inserted into an inner circumferential side of the rotating shaft 13 and the input shaft 20, and an output side member 27 fixed to rigid internally toothed gear 16.

As described above, the motor 7 includes the rotor 14 and the stator 15. The rotor 14 includes a rotating shaft 13 and a drive magnet 29 fixed to the rotating shaft 13. The rotating shaft 13 is formed in a substantially cylindrical shape elongated in the vertical direction, and disposed so that an axial direction of the rotating shaft 13 and the vertical direction are coincident with each other. That is, the vertical direction is the axial direction of the rotating shaft 13 and an axial direction of the rotor 14. The drive magnet 29 is formed in a cylindrical shape. A length (length in the vertical direction) of the drive magnet 29 is smaller than that of the rotating shaft 13, and the drive magnet 29 is fixed to an outer circumferential surface of a lower end side portion of the rotating shaft 13.

The stator 15 is formed in a substantially cylindrical shape as a whole and is disposed on an outer circumferential side of the drive magnet 29 to cover the outer circumferential surface of the drive magnet 29. An upper end side portion of the rotating shaft 13 protrudes upward with respect to an upper end surface of the stator 15. The stator 15 includes a drive coil and a stator core having a plurality of salient poles around which the drive coil is wound with an insulator interposed therebetween. The salient poles of the stator core are formed to protrude toward an inner circumferential side, and distal end surfaces of the salient poles face the outer circumferential surface of the drive magnet 29. The motor 7 is fixed to the case body 11. Specifically, an outer circumferential surface of the stator 15 is fixed to the case body 11.

As described above, the speed reducer 8 includes the rigid internally toothed gear 16, the flexible externally toothed gear 17, the wave generator 18, and the cross roller bearing 19. The rigid internally toothed gear 16 is formed in a flat substantially cylindrical shape and disposed so that an axial direction of the rigid internally toothed gear 16 and the vertical direction are coincident with each other. That is, the vertical direction is the axial direction of the rigid internally toothed gear 16 which is the output shaft of the speed reducer 8. The rigid internally toothed gear 16 is fixed to an inner ring 19a of the cross roller bearing 19. An outer ring 19b of the cross roller bearing 19 is fixed to a lower end side portion of the case body 11, and the rigid internally toothed gear 16 is rotatably held by the lower end side portion of the case body 11 via the cross roller bearing 19.

The flexible externally toothed gear 17 is formed in a flanged substantially cylindrical shape having a flange portion 17a at an upper end thereof. The flange portion 17a is formed in a substantially annular shape, and an outer circumferential side portion of the flange portion 17a is fixed to the case body 11. That is, the speed reducer 8 is fixed to the case body 11. The rigid internally toothed gear 16 constitutes a lower end side portion of the speed reducer 8. The flange portion 17a constitutes an upper end side portion of the speed reducer 8. Internal teeth are formed on an inner circumferential surface of the rigid internally toothed gear 16. External teeth that engage with the internal teeth of the rigid internally toothed gear 16 are formed on an outer circumferential surface on a lower end side of the flexible externally toothed gear 17.

As described above, the wave generator 18 includes the input shaft 20 and the wave bearing 21. The input shaft 20 is formed in a tubular shape as a whole elongated in the vertical direction, and disposed so that an axial direction of the input shaft 20 and the vertical direction are coincident with each other. A portion of the input shaft 20 other than a lower end side portion is formed in an elongated substantially cylindrical shape. A lower end side portion of the input shaft 20 forms an elliptical portion 20a in which a shape of an inner circumferential surface is circular when viewed from an axial direction of the input shaft 20 and a shape of an outer circumferential surface is elliptical when viewed from the axial direction of the input shaft 20.

An upper end side portion of the input shaft 20 is inserted and fixed to an inner circumferential side of the lower end side portion of the rotating shaft 13. Specifically, the upper end side portion of the input shaft 20 is inserted and fixed to the inner circumferential side of a portion of the rotating shaft 13 to which the drive magnet 29 is fixed. The rotating shaft 13 and the input shaft 20 are disposed coaxially. Also, the upper end side portion of the input shaft 20 is fixed to the rotating shaft 13 by bonding.

A central portion of the input shaft 20 in the vertical direction is rotatably supported by a bearing 30. The bearing 30 is a ball bearing. The bearing 30 is attached to a bearing holding member 31, and the bearing holding member 31 is fixed to the case body 11. That is, the input shaft 20 is rotatably supported by the bearing 30 attached to the case body 11 via the bearing holding member 31. The bearing holding member 31 is formed in an annular and flat plate shape and is fixed to the case body 11 to overlap the flange portion 17a of the flexible externally toothed gear 17 in the vertical direction.

The wave bearing 21 is a ball bearing having a flexible inner ring and an outer ring. The wave bearing 21 is disposed along an outer circumferential surface of the elliptical portion 20a and is bent into an elliptical shape. A lower end side portion of the flexible externally toothed gear 17 on which the external teeth are formed is disposed on an outer circumferential side of the wave bearing 21 to surround the wave bearing 21, and this portion is bent into an elliptical shape. The external teeth of the flexible externally toothed gear 17 engage with the internal teeth of the rigid internally toothed gear 16 at two portions in a long axis direction of a lower end side portion of the flexible externally toothed gear 17 bent into an elliptical shape.

The output side member 27 is formed in a flanged substantially cylindrical shape having a flange portion 27a and a tubular portion 27b. The output side member 27 is disposed so that an axial direction of the output side member 27 and the vertical direction are coincident with each other, and a through hole 27c penetrating in the vertical direction is formed on an inner circumferential side of the output side member 27. The flange portion 27a is formed in a flat plate shape and an annular shape, and is connected to a lower end of the tubular portion 27b. The flange portion 27a is fixed to the rigid internally toothed gear 16 so that an upper surface of the flange portion 27a is in contact with a lower surface of the rigid internally toothed gear 16. Further, the flange portion 27a is disposed on a lower side of the lower end of the case body 11, and is disposed outside the case body 11.

A small-diameter portion 27d having an outer diameter smaller than that of a lower end side portion of the tubular portion 27b is formed on an upper end side of the tubular portion 27b and an annular stepped surface 27e perpendicular to the vertical direction is formed on an outer circumferential side of an upper end side portion of the tubular portion 27b. The small-diameter portion 27d is inserted into an inner circumferential side of a lower end side portion of the tubular member 26, and a lower end surface of the tubular member 26 faces the stepped surface 27e. Further, the through hole 27c communicates with an inner circumferential side of the tubular member 26. The upper end side portion of the tubular portion 27b is disposed on an inner circumferential side of the lower end side portion of the input shaft 20. A bearing 34 is disposed between an outer circumferential surface of the tubular portion 27b and an inner circumferential surface of the lower end side portion of the input shaft 20. The bearing 34 is a ball bearing.

The tubular member 26 is formed in a cylindrical shape elongated in the vertical direction and is disposed so that an axial direction of the tubular member 26 and the vertical direction are coincident with each other. As described above, the tubular member 26 is inserted into inner circumferential side of the rotating shaft 13 and the input shaft 20. An upper end surface of the tubular member 26 is disposed on an upper side of an upper end surface of the rotating shaft 13 and the lower end surface of the tubular member 26 is disposed on an upper side of a lower end surface of the input shaft 20. Further, as described above, the small-diameter portion 27d of the output side member 27 is inserted into the inner circumferential side of the lower end side portion of the tubular member 26, the lower end surface of the tubular member 26 faces the stepped surface 27e, and the lower end side of the tubular member 26 is held by the output side member 27.

An upper end side of the tubular member 26 is held by a holding member 32. The holding member 32 is fixed to a support column 33, and the support column 33 is fixed to the case body 11. That is, the holding member 32 is fixed to the case body 11 via the support column 33. The holding member 32 includes a cylindrical holding portion 32a that holds the upper end side of the tubular member 26. The holding portion 32a is disposed so that an axial direction of the holding portion 32a and the vertical direction are coincident with each other, and a through hole 32b penetrating in the vertical direction is formed on an inner circumferential side of the holding portion 32a.

A large-diameter portion 32c having an inner diameter larger than that of an upper end side of the holding portion 32a is formed on a lower end side of the holding portion 32a, and an annular stepped surface 32d perpendicular to the vertical direction is formed on an inner circumferential side of a lower end side portion of the holding portion 32a. The upper end side of the tubular member 26 is inserted into an inner circumferential side of the large-diameter portion 32c, and the upper end surface of the tubular member 26 faces the stepped surface 32d. Further, the through hole 32b communicates with the inner circumferential side of the tubular member 26.

The position detection mechanism 9 is disposed on an upper side of the stator 15. The position detection mechanism 9 includes a slit plate 36 fixed to the upper end side of the rotating shaft 13 and a sensor 37. The sensor 37 is a transmission type optical sensor including a light emitting element and a light receiving element which are disposed to face each other. The sensor 37 is fixed to a support member 38. The support member 38 is fixed to the case body 11. That is, the sensor 37 is fixed to the case body 11 via the support member 38. The slit plate 36 is formed in a thin flat plate shape and is annular. In the slit plate 36, a plurality of slit holes are formed at regular intervals in a circumferential direction of the slit plate 36. The slit plate 36 is fixed to the rotating shaft 13 so that a portion in the circumferential direction of the slit plate 36 is disposed between the light emitting element and the light receiving element of the sensor 37.

The case body 11 is constituted by a case body 41 in which both upper and lower ends are open, and a cover 42 closing the opening on the upper end side of the case body 41. The opening on the lower end side of the case body 41 is closed by the speed reducer 8. An opening portion 41a which is open in a direction perpendicular to the vertical direction is formed on a side surface of the case body 41. That is, the opening portion 41a which is open in a direction perpendicular to the vertical direction is formed in the case body 11. The opening portion 41a is formed to penetrate the side surface portion of the case body 41.

A through hole 42a in which a pin 53 to be described below constituting the rotation restricting mechanism 25 is disposed is formed at an upper surface portion of the cover 42. That is, the through hole 42a is formed in the case body 11. The through hole 42a is formed to penetrate the upper surface portion of the cover 42 in the vertical direction, and thereby the inside and the outside of the case body 11 communicate with each other via the through hole 42a. Further, the through hole 42a is formed in a round hole shape.

The rotation restricting mechanism 25 is provided to hold the stopped rotor 14 at a stopped position thereof, and is accommodated in the case body 11. The rotation restricting mechanism 25 includes the flat plate-like and substantially annular rotation-side restricting member 45 fixed to the rotor 14, the fixed-side restricting member 46 which engages with the rotation-side restricting member 45 to restrict movement of the rotation-side restricting member 45 in a circumferential direction of the rotor 14, a drive mechanism 47 which moves the fixed-side restricting member 46 in the vertical direction, and a linear bush 48 which guides the fixed-side restricting member 46 in the vertical direction. The drive mechanism 47 includes a compression coil spring 49 as a biasing member which biases the fixed-side restricting member 46 upward, and a solenoid 50 which moves the fixed-side restricting member 46 downward.

The solenoid 50 is fixed to the case body 11 so that a plunger 50a of the solenoid 50 protrudes downward when the solenoid 50 is in an energized state. An upper end portion of the plunger 50a protrudes upward from a main body portion 50b of the solenoid 50. The pin 53 is fixed to the upper end portion of the plunger 50a protruding upward from the main body portion 50b. The pin 53 is formed in a flanged columnar shape including a columnar shaft portion 53a, and an annular flange portion 53b extending outward in a radial direction from one end of the shaft portion 53a.

The pin 53 is fixed to the plunger 50a so that an axial direction of the pin 53 and the vertical direction are coincident with each other and the flange portion 53b is disposed on a lower side thereof. Further, the pin 53 is disposed coaxially with the plunger 50a. The shaft portion 53a is disposed in the through hole 42a. An outer diameter of the shaft portion 53a is slightly smaller than an inner diameter of the through hole 42a. Further, a recessed portion into which the upper end portion of the plunger 50a is inserted and fixed is formed on a lower surface of the flange portion 53b.

The rotation-side restricting member 45 is fixed to the upper end surface of the rotating shaft 13 so that a thickness direction of the rotation-side restricting member 45 and the vertical direction are coincident with each other, and is disposed on an upper side of the position detection mechanism 9. As illustrated in FIG. 5, a plurality of protrusions 45a protruding outward in a radial direction of the rotor 14 are formed on the rotation-side restricting member 45 at regular intervals in a circumferential direction of the rotor 14. In the present embodiment, twelve protrusions 45a are formed at a pitch of 30° with respect to a center of the rotation-side restricting member 45. Further, each of the protrusions 45a is formed so that a shape thereof when viewed from the vertical direction is a substantially isosceles trapezoidal shape. Further, the number of protrusions 45a formed on the rotation-side restricting member 45 may be 11 or less, or 13 or more.

The fixed-side restricting member 46 is formed in a flanged columnar shape having a flange portion 46a at an upper end thereof, and is disposed so that an axial direction of the fixed-side restricting member 46 and the vertical direction are coincident with each other. The flange portion 46a is formed in an annular shape, and an outer shape of the flange portion 46a when viewed from the vertical direction is a circular. The fixed-side restricting member 46 is fixed to the plunger 50a disposed on an upper side of the fixed-side restricting member 46. Specifically, the fixed-side restricting member 46 is fixed to a lower end portion of the plunger 50a. As illustrated in FIG. 4, a recessed portion 46b recessed toward an upper side is formed on a lower end surface of the fixed-side restricting member 46, and an upper end side portion of the compression coil spring 49 is disposed in the recessed portion 46b.

The fixed-side restricting member 46 is disposed on an outer circumferential side of the rotation-side restricting member 45 when viewed from the vertical direction. Specifically, when viewed in the vertical direction, as illustrated in FIG. 5, the fixed-side restricting member 46 is disposed so that a portion of the flange portion 46a is disposed on an inner side in a radial direction of the rotor 14 than a virtual circle VC connecting distal end surfaces of the plurality of protrusions 45a of the rotation-side restricting member 45. A diameter D1 of the flange portion 46a (see FIG. 5) when viewed from the vertical direction is substantially half of a distance L between the protrusions 45a (see FIG. 5) in the circumferential direction of the rotor 14.

The linear bush 48 is formed in a flanged cylindrical shape having a flange portion 48a at an upper end thereof, and is disposed so that an axial direction of the linear bush 48 and the vertical direction are coincident with each other. A portion of the linear bush 48 on a lower side of the flange portion 48a is disposed in a recessed portion 38a (see FIG. 4) formed on an upper surface of the support member 38. A recess 38b in which a lower end portion of the compression coil spring 49 is disposed is formed on a bottom surface of the recessed portion 38a to be recessed downward. A portion of the fixed-side restricting member 46 on a lower side of the flange portion 46a is disposed on an inner circumferential side of the linear bush 48.

In the present embodiment, the solenoid 50 is in a non-energized state when the motor 7 has stopped, and is in an energized state when the motor 7 is driven. When the solenoid 50 is in the non-energized state, as illustrated in FIG. 4(B), the fixed-side restricting member 46 is raised so that the flange portion 46a of the fixed-side restricting member 46 is disposed between the protrusions 45a of the rotation-side restricting member 45 in the circumferential direction of the rotor 14 due to a biasing force of the compression coil spring 49. Therefore, rotation of the stopped rotor 14 is restricted due to the protrusions 45a of the rotation-side restricting member 45 and the flange portion 46a. On the other hand, when the solenoid 50 is in the energized state, as illustrated in FIG. 4(A), the fixed-side restricting member 46 is lowered until the plunger 50a protrudes downward and removes the flange portion 46a from between the protrusions 45a of the rotation-side restricting member 45 in the circumferential direction of the rotor 14. Therefore, the rotor 14 becomes rotatable.

As described above, the drive mechanism 47 moves the fixed-side restricting member 46 between the restriction position (a position illustrated in FIG. 4(B)) at which the flange portion 46a is disposed between the protrusions 45a in the circumferential direction of the rotor 14, and the restriction release position (a position illustrated in FIG. 4(A)) at which the flange portion 46a is removed from between the protrusions 45a in the circumferential direction of the rotor 14. Further, the compression coil spring 49 biases the fixed-side restricting member 46 toward the restriction position, and the solenoid 50 moves the fixed-side restricting member 46 at the restriction position toward the restriction release position.

When the fixed-side restricting member 46 is at the restriction position, as illustrated in FIG. 6(A), a portion of an upper end side of the pin 53 protrudes to the outside of the case body 11. Further, when a portion of the upper end side of the pin 53 protruding to the outside of the case body 11 is pushed toward the inside of the case body 11 (that is, pushed downward), as illustrated in FIG. 6(B), the fixed-side restricting member 46 at the restriction position moves to the restriction release position.

The flange portion 46a of the present embodiment enters between the protrusions 45a in the circumferential direction of the rotor 14, and thereby serving as a restricting portion that restricts movement of the rotation-side restricting member 45 in the circumferential direction of the rotor 14. Further, when the fixed-side restricting member 46 is at the restriction release position, the plunger 50a disposed on the outer circumferential side of the rotation-side restricting member 45 is disposed at a position not in contact with the protrusions 45a.

The circuit board 10 is a rigid board such as a glass epoxy board, and is formed in a flat plate shape. The circuit board 10 is fixed to the case body 11 so that a thickness direction of the circuit board 10 and the vertical direction are coincident with each other. Further, the circuit board 10 is fixed to an upper end side of the case body 11, and is disposed on an upper side of the rotation-side restricting member 45. The upper end of the tubular member 26 is disposed on an upper side of an upper surface of the circuit board 10.

On the circuit board 10, a motor drive circuit for driving the motor 7 and a signal transmission circuit for outputting signals input to the circuit board 10 to the outside of the circuit board 10 are mounted. In addition, at least two connectors are mounted on the circuit board 10. A wiring connected to one of the two connectors is pulled to pass through the inner circumferential side of the tubular member 26 and then is drawn out from the through hole 27c of the output side member 27, and a wiring connected to the other connector is drawn out from the opening portion 41a of the case body 11.

Connecting Structure of Joint Portions and Arms

As described above, the support member 4 and the first joint portion 2A are connected such that these are rotatable relative to each other, the first joint portion 2A and the second joint portion 2B are connected such that these are rotatable relative to each other, the second joint portion 2B and the base end of the first arm 3A are fixed, a distal end of the first arm 3A and the third joint portion 2C are fixed, the third joint portion 2C and the fourth joint portion 2D are connected such that these are rotatable relative to each other, the fourth joint portion 2D and the base end of the second arm 3B are connected such that these are rotatable relative to each other, the distal end of the second arm 3B and the fifth joint portion 2E are fixed, and the fifth joint portion 2E and the sixth joint portion 2F are connected such that these are rotatable relative to each other. Specifically, for example, each of the joint portions 2 and each of the arms 3 are connected so that the robot 1 can perform an operation illustrated in FIG. 2(B) as follows.

Further, in the following description, an axial direction of the rigid internally toothed gear 16 of the first joint portion 2A is referred to as an "axial direction of the first joint portion 2A," an axial direction of the rigid internally toothed gear 16 of the second joint portion 2B is referred to as an "axial direction of the second joint portion 2B," an axial direction of the rigid internally toothed gear 16 of the third joint portion 2C is referred to as an "axial direction of the third joint portion 2C," an axial direction of the rigid internally toothed gear 16 of the fourth joint portion 2D is referred to as an "axial direction of the fourth joint portion 2D,"

an axial direction of the rigid internally toothed gear 16 of the fifth joint portion 2E is referred to as an "axial direction of the fifth joint portion 2E," and an axial direction of the rigid internally toothed gear 16 of the sixth joint portion 2F is referred to as an "axial direction of the sixth joint portion 2F."

First, the support member 4 and the first joint portion 2A are connected by fixing an end surface of the support member 4 on a side on which the flange portion 4a is not formed to the flange portion 27a of the first joint portion 2A. That is, the support member 4 and the first joint portion 2A are connected so that the axial direction of the first joint portion 2A and the axial direction of the support member 4 are coincident with each other. The first joint portion 2A and the second joint portion 2B are connected so that the axial direction of the first joint portion 2A and the axial direction of the second joint portion 2B are perpendicular to each other. Further, a side surface of the case body 41 of the first joint portion 2A on which the opening portion 41a is formed is fixed to the flange portion 27a of the second joint portion 2B.

The second joint portion 2B and the first arm 3A are connected so that the axial direction of the second joint portion 2B and a longitudinal direction (axial direction) of the first arm 3A are perpendicular to each other. Further, the base end of the first arm 3A is fixed to a side surface of the case body 41 of the second joint portion 2B on which the opening portion 41a is formed. The first arm 3A and the third joint portion 2C are connected so that the longitudinal direction of the first arm 3A and the axial direction of the third joint portion 2C are perpendicular to each other. Further, the distal end of the first arm 3A is fixed to a side surface of the case body 41 of the third joint portion 2C on which the opening portion 41a is formed.

The third joint portion 2C and the fourth joint portion 2D are connected so that the axial direction of the third joint portion 2C and the axial direction of the fourth joint portion 2D are perpendicular to each other. Also, a side surface of the case body 41 of the fourth joint portion 2D on which the opening portion 41a is formed is fixed to the flange portion 27a of the third joint portion 2C. More specifically, the side surface of the case body 41 of the fourth joint portion 2D on which the opening portion 41a is formed is fixed to the flange portion 27a of the third joint portion 2C via a connecting member 63 fixed to the side surface of the case body 41 of the fourth joint portion 2D on which the opening portion 41a is formed. The connecting member 63 is formed in a flanged cylindrical shape having a flange portion 63a fixed to the flange portion 27a of the third joint portion 2C.

The fourth joint portion 2D and the second arm 3B are connected so that the axial direction of the fourth joint portion 2D and a longitudinal direction of the second arm 3B are coincident with each other. Further, the base end of the second arm 3B is fixed to the flange portion 27a of the fourth joint portion 2D. Further, a flange portion 3a for fixing the base end of the second arm 3B to the flange portion 27a of the fourth joint portion 2D is formed at the base end of the second arm 3B, and thereby the flange portion 27a of the fourth joint portion 2D and the flange portion 3a are fixed to each other.

The second arm 3B and the fifth joint portion 2E are connected so that the longitudinal direction of the second arm 3B and the axial direction of the fifth joint portion 2E are perpendicular to each other. Also, the distal end of the second arm 3B is fixed to a side surface of the case body 41 of the fifth joint portion 2E on which the opening portion 41a is formed. The fifth joint portion 2E and the sixth joint portion 2F are connected so that the axial direction of the fifth joint portion 2E and the axial direction of the sixth joint portion 2F are perpendicular to each other. A side surface of the case body 41 of the sixth joint portion 2F on which the opening portion 41a is formed is fixed to the flange portion 27a of the fifth joint portion 2E.

Main Effects of the Present Embodiment

As described above, in the present embodiment, the plurality of protrusions 45a protruding outward in the radial direction of the rotor 14 are formed on the rotation-side restricting member 45 fixed to the rotor 14 at regular intervals in the circumferential direction, and the flange portion 46a entering between the protrusions 45a in the circumferential direction of the rotor 14 to restrict movement of the rotation-side restricting member 45 in the circumferential direction of the rotor 14 is formed in the fixed-side restricting member 46. Further, in the present embodiment, when the motor 7 has stopped (that is, when the rotor 14 has stopped), the fixed-side restricting member 46 is at the restriction position in which the flange portion 46a is disposed between the protrusions 45a in the circumferential direction of the rotor 14.

Therefore, in the present embodiment, when an external force in the rotational direction acts on the stopped rotor 14, although the rotor 14 rotates to an extent as much as a gap between the protrusion 45a and the flange portion 46a in the circumferential direction of the rotor 14, the rotor 14 does not rotate more than the gap. Therefore, in the present embodiment, even when an external force in the rotational direction acts on the stopped rotor 14, a deviation of the stopped rotor 14 from the stopped position can be inhibited using the fixed-side restricting member 46 disposed at the restriction position and the rotation-side restricting member 45. As a result, in the present embodiment, even when an external force in the rotational direction acts on the stopped rotor 14, it is possible to inhibit a deviation in posture of the robot 1 that has stopped.

In the present embodiment, a diameter D1 of the flange portion 46a when viewed from the vertical direction is substantially half of a distance L between the protrusions 45a in the circumferential direction of the rotor 14. Therefore, in the present embodiment, it is possible to inhibit a deviation of the stopped rotor 14 from the stopped position while reducing a size of the flange portion 46a in the radial direction of the rotor 14. Accordingly, in the present embodiment, it is possible to inhibit a deviation of the stopped rotor 14 from the stopped position while reducing a size of each of the joint portions 2 in the radial direction of the rotor 14.

In the present embodiment, the protrusion 45a is formed to protrude outward in the radial direction of the rotor 14. Therefore, in the present embodiment, it is possible to dispose the fixed-side restricting member 46 and the drive mechanism 47 on the outer circumferential side of the rotation-side restricting member 45 in which a relatively large space is easily secured. Therefore, in the present embodiment, the fixed-side restricting member 46 and the drive mechanism 47 are more easily disposed.

In the present embodiment, the compression coil spring 49 biases the fixed-side restricting member 46 toward the restriction position. Therefore, in the present embodiment, even when power supply to the robot 1 is turned off, a deviation of the stopped rotor 14 from the stopped position can be inhibited, and as a result, it is possible to inhibit a deviation in posture of the robot 1 which has stopped.

In the present embodiment, when the fixed-side restricting member 46 is at the restriction position, a portion of the upper end side of the pin 53 protrudes to the outside of the case body 11, and when a portion of the upper end side of the pin 53 protruding to the outside of the case body 11 is pushed toward the inside of the case body 11, the fixed-side restricting member 46 at the restriction position moves to the restriction release position. Therefore, in the present embodiment, even when power supply to the robot 1 is turned off, the fixed-side restricting member 46 at the restriction position can be moved to the restriction release position by a manual operation or the like. Therefore, in the present embodiment, even when power supply to the robot 1 is turned off, it is possible to rotate the rotor 14 and operate the robot 1.

Another Embodiment

The above-described embodiment is an example of a preferred embodiment of the present invention, but the present invention is not limited thereto, and various modifications can be made without changing the gist of the present invention.

In the embodiment described above, the compression coil spring 49 biases the fixed-side restricting member 46 upward and the solenoid 50 moves the fixed-side restricting member 46 downward, but the compression coil spring 49 may bias the fixed-side restricting member 46 downward and the solenoid 50 may move the fixed-side restricting member 46 upward. Further, in the embodiment described above, the fixed-side restricting member 46 is biased by the compression coil spring 49, but the fixed-side restricting member 46 may be biased by other spring members such as a tension coil spring.

In the embodiment described above, the protrusions 45a are formed to protrude outward in the radial direction of the rotor 14, but the protrusions 45a may protrude inward in the radial direction of the rotor 14. Further, in the embodiment described above, the diameter D1 of the flange portion 46a when viewed from the vertical direction is substantially half of the distance L between the protrusions 45a in the circumferential direction of the rotor 14, but the diameter D1 may be half of the distance L or less. Further, the diameter D1 may be half of the distance L or more as long as the diameter D1 is equal to or less than the distance L.

In the embodiment described above, the pin 53 is fixed to the upper end portion of the plunger 50a, but the pin 53 may not be fixed to the upper end portion of the plunger 50a. In this case, a length of the upper end portion of the plunger 50a protruding upward with respect to the main body portion 50b of the solenoid 50 is increased, and the upper end portion of the plunger 50a is disposed in the through hole 42a. Further, when the fixed-side restricting member 46 is at the restriction position, the upper end portion of the plunger 50a protrudes to the outside of the case body 11, and when the upper end portion of the plunger 50a protruding to the outside of the case body 11 is pushed toward the inside of the case body 11, the fixed-side restricting member 46 at the restriction position moves to the restriction release position.

Further, when the pin 53 is not fixed to the upper end portion of the plunger 50a, the upper end portion of the plunger 50a may be disposed inside the case body 11 when the fixed-side restricting member 46 is at the restriction position. In this case, the through hole 42a may not be formed in the cover 42.

In the embodiment described above, the rigid internally toothed gear 16 serves as the output shaft of the speed reducer 8, but the flexible externally toothed gear 17 may serve as the output shaft of the speed reducer 8. In this case, the rigid internally toothed gear 16 is fixed to the case body 11 and the inner ring 19a of the cross roller bearing 19, and the flexible externally toothed gear 17 is fixed to the outer ring 19b of the cross roller bearing 19 and the flange portion 27a of the output side member 27. Also, in the above-described embodiment, the speed reducer 8 is a hollow wave gear device, but the speed reducer 8 may be a hollow speed reducer other than the hollow wave gear device. Also, the speed reducer 8 may be a speed reducer other than the hollow speed reducer. Also, in the embodiment described above, the motor 7 is a hollow motor, but the motor 7 may be a motor other than the hollow motor. Further, in the embodiment described above, the motor 7 is a so-called inner rotor type motor, but the motor 7 may be an outer rotor type motor.

In the embodiment described above, the robot 1 includes six joint portions 2, but the number of joint portions 2 included in the robot 1 may be five or less, or may be seven or more. Also, in the embodiment described above, the robot 1 includes two arms 3, but the number of arms 3 included in the robot 1 may be one or may be three or more. Also, in the embodiment described above, each of the joint portions 2 of the robot 1 are constituted by a rotary actuator having the motor 7, the speed reducer 8, and the like, but the rotary actuator may be used for other applications besides the joint portion 2 of the robot 1. For example, the rotary actuator may be used as a drive portion of a θ stage (rotary stage) or the like. Further, in the embodiment described above, the robot 1 is an industrial robot, but the robot 1 can be applied to various applications. For example, the robot 1 may be a service robot.

The invention claimed is:

1. A rotary actuator comprising:
   a motor including a rotor and a stator; and
   a rotation restricting mechanism which restricts rotation of the rotor that has stopped;
   a case body in which the motor and the rotation restricting mechanism is accommodated, wherein
   the rotation restricting mechanism includes:
   a substantially annular rotation-side restricting member fixed to the rotor;
   a fixed-side restricting member which engages with the rotation-side restricting member to restrict movement of the rotation-side restricting member in a circumferential direction of the rotor; and
   a drive mechanism which moves the fixed-side restricting member in an axial direction of the rotor,
   a plurality of protrusions which protrude inward or outward in a radial direction of the rotor are formed on the rotation-side restricting member at regular intervals in the circumferential direction,
   a restricting portion which enters between the protrusions in the circumferential direction to restrict movement of the rotation-side restricting member in the circumferential direction is formed in the fixed-side restricting member, and
   the drive mechanism moves the fixed-side restricting member between a restriction position at which the restricting portion is disposed between the protrusions in the circumferential direction and a restriction release position at which the restricting portion is removed from between the protrusions in the circumferential direction,
   wherein the drive mechanism comprises:
   a biasing member which biases the fixed-side restricting member toward one side in the axial direction; and
   a solenoid which moves the fixed-side restricting member to the other side in the axial direction,
   wherein the biasing member biases the fixed-side restricting member toward the restriction position,
   the solenoid moves the fixed-side restricting member at the restriction position to the restriction release position,
   the fixed-side restricting member is fixed to one end portion of a plunger of the solenoid,
   a through hole in which the other end portion of the plunger or a pin fixed to the other end portion of the plunger is disposed is formed in the case body,
   the other end portion of the plunger or a portion of the pin protrudes to the outside of the case body when the fixed-side restricting member is at the restriction position, and
   the fixed-side restricting member at the restriction position moves to the restriction release position when the other end portion of the plunger or a portion of the pin protruding to the outside of the case body is pushed toward the inside of the case body.

2. The rotary actuator according to claim 1, wherein an outer shape of the restricting portion is circular when viewed from the axial direction, and a diameter of the restricting portion when viewed from the axial direction is substantially half of a distance between the protrusions in the circumferential direction.

3. The rotary actuator according to claim 1, wherein the protrusions protrude outward in the radial direction.

4. A robot comprising a joint portion constituted by the rotary actuator according to claim 1.

* * * * *